(12) United States Patent
Ohsuge

(10) Patent No.: US 7,075,974 B2
(45) Date of Patent: Jul. 11, 2006

(54) MULTI-PATH DETECTION CIRCUIT AND METHOD FOR A CDMA RECEIVER

(75) Inventor: Michihiro Ohsuge, Tokyo (JP)

(73) Assignee: NEC Corporation, Tokyo (JP)

( * ) Notice: Subject to any disclaimer, the term of this patent is extended or adjusted under 35 U.S.C. 154(b) by 712 days.

(21) Appl. No.: 09/991,876

(22) Filed: Nov. 26, 2001

(65) Prior Publication Data

US 2002/0064217 A1    May 30, 2002

(30) Foreign Application Priority Data

Nov. 27, 2000    (JP)    ............................. 2000-359055

(51) Int. Cl.
*H04B 1/69* (2006.01)
(52) U.S. Cl. .................. 375/152; 375/149; 375/148; 375/346; 375/150; 375/142; 375/343; 375/147; 455/561; 455/456.1; 370/326; 379/406.08
(58) Field of Classification Search ................ 375/152, 375/150, 142, 343, 148, 147, 149, 346; 455/561; 455/456.1; 370/328, 252, 342; 379/406.08
See application file for complete search history.

(56) References Cited

U.S. PATENT DOCUMENTS

| | | | | |
|---|---|---|---|---|
| 5,414,729 A | * | 5/1995 | Fenton | 375/149 |
| 5,615,232 A | * | 3/1997 | Van Nee | 375/346 |
| 5,692,008 A | * | 11/1997 | Van Nee | 375/148 |
| 5,737,410 A | * | 4/1998 | Vahatalo et al. | 379/406.08 |
| 5,812,593 A | * | 9/1998 | Kaku | 375/150 |
| 5,818,866 A | * | 10/1998 | Wilk | 375/149 |
| 5,828,659 A | * | 10/1998 | Teder et al. | 370/328 |
| 5,926,503 A | * | 7/1999 | Kelton et al. | 375/148 |
| 6,044,104 A | * | 3/2000 | Watanabe | 375/142 |
| 6,324,210 B1 | * | 11/2001 | Yang et al. | 375/152 |
| 6,370,397 B1 | * | 4/2002 | Popovic et al. | 455/561 |
| 6,625,202 B1 | * | 9/2003 | Sudo et al. | 375/147 |
| 6,658,046 B1 | * | 12/2003 | Miura | 375/148 |
| 6,697,629 B1 | * | 2/2004 | Grilli et al. | 455/456.1 |
| 6,831,956 B1 | * | 12/2004 | Schmidl et al. | 375/343 |

FOREIGN PATENT DOCUMENTS

| | | |
|---|---|---|
| EP | 0 718 998 A2 | 6/1996 |
| JP | 9-181704 | 7/1997 |
| JP | 2765574 | 4/1998 |
| JP | 10-271557 | 10/1998 |

(Continued)

OTHER PUBLICATIONS

WO 99/35763; Sourour et al.; Method and Apparatus for Multipath Delay Estimation in Direct Sequence Spread Spectrum Communication System; 15th, Jul. 1999.*

(Continued)

*Primary Examiner*—Chieh M. Fan
*Assistant Examiner*—Sudhanshu C. Pathak
(74) *Attorney, Agent, or Firm*—Foley & Lardner LLP

(57) ABSTRACT

In a multi-path detection circuit for use in a CDMA communication system, a first peak is detected by searching a maximum value over a whole of data blocks composed of delay profile data. A second and the following peaks are detected by carrying out maximum value searching operation again only about a data block that is renewed in the delay profile data. As the remaining data blocks, a maximum value searched a previous time is preserved and used a next time and, therefore, reduction is possible in connection with the number of detection cycles necessary for detecting the second and the following peaks.

7 Claims, 10 Drawing Sheets

FOREIGN PATENT DOCUMENTS

| | | |
|---|---|---|
| JP | 11-317694 | 11/1999 |
| JP | 2000-4211 | 1/2000 |
| JP | 2000-134135 | 5/2000 |
| JP | 2000-244456 | 9/2000 |
| JP | 2000-252867 | 9/2000 |
| JP | 2001-346239 | 12/2001 |
| WO | WO 99/63677 A1 | 12/1999 |
| WO | WO 00/04648 A1 | 1/2000 |

OTHER PUBLICATIONS

Aoyama et al., "Path-search Performance of DS-CDMA System in Laboratory and Field Experiments," *Technical Report of IEICE,* RCS97-164 (Nov. 1997), pp. 51-58.

* cited by examiner

MULTI-PATH DETECTION CIRCUIT AND METHOD FOR A CDMA RECEIVER

BACKGROUND OF THE INVENTION

This invention relates to a CDMA (Code Division Multiple Access) receiver and, in particular, to a multi-path detection method and circuit that is used in the CDMA receiver.

Conventionally, a wide variety of cellular communication systems have been proposed and used in the world. Among others, recent attention has been focused onto a cellular mobile CDMA system that has a specific spread code assigned to each channel and that will be simply called a CDMA system hereinafter. In such a CDMA system, a modulated radio wave is generated by spreading a transmission signal by the specific spread code to obtain a spread signal and by modulating the same carrier frequency by the spread signal and is transmitted from a transmission side (transmission terminal) to a reception one (reception terminal).

Responsive to the modulated radio wave, a CDMA receiver on the reception side executes synchronizing operation by the use of each of the specific spread codes and identifies a desired channel. From this fact, it is readily understood that each radio channel between a base station and a mobile terminal can be distinguished from one another by using different spread codes. At any rate, the CDMA system makes it possible to use the same carrier frequency by a plurality of stations (base station and mobile terminal) and to identify each station by the use of the spread codes.

In this event, it is to be noted that the modulated radio wave is received by the reception side through a plurality of transmission or propagation paths that may be collectively called a multi-path. Therefore, multi-path fading should be removed from the modulated radio signal by correctly detecting a predetermined signal, such as a synchronization signal and/or a pilot signal, in the CDMA system. In other words, a transmission signal transmitted from a transmission station in the CDMA system is reflected by buildings, mountains, and the like, propagated through a plurality of transmission paths that are subtly different in propagation time from one another, and thereafter received by a reception station as reception signals which are usually referred to as a multi-path signal. This shows that the reception station should receive the multi-path signal in timed relation to each timing of the reception signals.

In Japanese Unexamined Patent Publication No. Hei 9-181704 (181704/1997) (will be called first reference), description is made about a conventional CDMA signal receiver apparatus and a multi-path searching method. Specifically, the CDMA signal receiver apparatus described in the first reference has a first portion for carrying out multi-path detection in consideration of a communication environment and a second portion (rake combining portion) for combining a plurality of paths in phase with one another. The first portion is called a multi-path search portion or a searcher while the second portion is called a rake combining receiver or a rake receiver.

Herein, the above-mentioned CDMA signal receiver apparatus operates in a following manner. At first, the multi-path search portion measures a delay profile to select some paths that are large in reception power within a measurement range and to inform the rake receiver of timing of each of the paths. The "delay profile" means a signal power distribution relative to a delay time. The rake receiver carries out de-spread operation of each path on the basis of the timing information sent from the multi-path search portion and executes rake combining operation. The resultant rake receiver can realize a path diversity effect.

In the meanwhile, the rake receiver in the first reference has a tracking portion that tracks or follows a variation of a designated path. In this case, path information should be informed from the multi-path search portion to the rake receiver at least at an initial period or at a predetermined period.

The first reference has two problems. One of the problems is that, in order to search some paths from multi-paths with reference to the measured delay profile, maximum search operations should be executed by the number of the searched paths or sort processing should be executed over whole profile data. Consequently it takes a long time to search the multi-path, which brings about an increase of current consumption.

In addition, an optimum device should be prepared so as to search a desired number of correlation peaks from the delay profile. This is because the delay profile generally includes a great amount of data and a processing time inevitably becomes long so as to search a plurality of peaks from the whole data of the delay profile.

Another one of the problems described in the first reference will be described in detail. In general, a configuration of the correlation peaks appearing on the delay profile has widths along a time. Therefore, a sort algorithm of the binary tree search is disadvantageous in that data included in a single peak are repeatedly detected. This shows that the first problem can not be always solved even when usual high speed sort algorithm is used.

In this case, a method is used to calculate a minimum interval of each finger position by removing, from a next following peak detection, a detected peak and t-samples prior and after the detected path and to set the minimum interval of each finger position (For example, Aoyama et al. "Path-Search Performance of DS-WCDMA System in Laboratory and Field Experiments" Technical Report of IEICE, RCS97-164 (1997-11)). However, it is required in this method to repeat, over the number of the detected peaks, various processes, such as a maximum value search, a removal of t-samples prior and after the peak. Therefore, the multi-path detection circuit mentioned in the first reference is disadvantageous in that a processing time becomes long as an increase of the peak number of the detected peaks.

A similar rake receiver of the type described is known also in any other references. For example, disclosure is made about such a rake receiver in Japanese Unexamined Patent Publication No. 2000-4211 (will be called second reference). Simply, the rake receiver disclosed in the second reference can keep synchronization by a small amount of processing. To this end, a plurality of de-spreaders are prepared in each finger receiving circuit so that multi-path components can be received even when the delay time in the multi-path component is largely varied in an environment. In other words, the rake receiver can receive the multi-path components even when any tracking can not be achieved by synchronization operation, such as synchronization capturing operation and synchronization keeping operation which uses DLL (Delay Locked Loop) technique. Specifically, the multi-path components can be received by the de-spreaders at different timing while a selector instantaneously selects an output signal from either one of the de-spreaders at timing corresponding to the varied delay time. As a result, each finger receiver can receive the multi-path component in a good condition and the rake receiver can receive an excellent desired wave.

As mentioned above, each finger receiver described in the second reference comprises the plurality of the de-spread circuits for demodulating the reception signal by using the spread codes that are shifted by times different from one another in the delay circuits and the selector responsive to outputs given from the de-spread circuits for selecting either one of output signals that has a good quality. However, no consideration is made at all about a multi-path detection circuit and its structure.

In Japanese Unexamined Patent Publication No. 2000-244456 (will be called third reference), disclosure is made about a path detection device and its control method of detecting a delayed wave received through a long delay path in a DS(direct sequence)-CDMA demodulator. In the path detection device mentioned in the third reference, when a reception signal sampled is given to a matched filter, the sampled reception signal is supplied at every sample to a shift register of the matched filter. The signals given to the shift register are multiplied through a switch by spread code replicas stored in registers, respectively, to obtain products or results of multiplication. The products are added by adders to one another to calculate a correlation value. The calculated correlation value is output from the matched filter.

Thus, the third reference discloses a technique of forming a plurality of delay profiles by the matched filter in order to detect a path of a delayed wave having a long delay time. However, no teaching is made in the third reference about executing multi-path detection at a high speed.

Moreover, description is made in Japanese Unexamined Patent Publication No. 2000-252867 (will be called fourth reference) about a spread spectrum communication device that can accomplish synchronization of a spread code at a high speed by shortening a time necessary for searching a multi-path. More specifically, the spread spectrum communication device described in the fourth reference has a plurality of correlators for carrying out rake receiving operation and a code generation timing controller. With this structure, each correlator gives generation timing of a spread code for carrying out de-spreading operation about a maximum path during reception and the code generation timing controller estimates a time region during which a multi-path signal is received with a high probability. In addition, the code generation timing controller controls generation timing of a spread code replica so as to receive either one of the correlators that operates as a searcher within the above-mentioned time region.

The fourth reference thus describes about shortening a time for a multi-path search. In the fourth reference, estimation is done about the time region wherein the multi-path signal is received with a high probability. Such estimation is carried out on the basis of generation timing of the spread code produced for de-spreading processing and a result of estimation is used to control the generation timing of the spread code replica in the searcher.

Furthermore, Japanese Unexamined Patent Publication No. Hei 10-271557 (namely, 271557/1998) (will be called fifth reference) discloses a random access signal receiver which is operable in a random access mode. In this random access signal receive, a time shortage for estimating a delay profile and for training necessary for path detection can be avoided together with restriction of an amount of control information transmitted. Specifically, the random access signal receiver comprises a delay profile timing detector, a matched filter and a path extractor. With this structure, the delay profile timing detector supplies path detection timing to the matched filter and the matched filter produces a de-spread signal on the basis of the path detection timing. The path extractor latches the de-spread signal sent from the matched filter and produces a transmission symbol of each path corresponding to each de-spread signal. Moreover, the transmission symbol of each path is detected by each detector and is converted into binary data in each data detection portion. Each random access judgment portion is operable to detect a correlation between the binary data and a random access starting synchronization word and to allow the binary data to pass therethrough as control information on detection of the above correlation. Finally, the random access judgment portion stops generating the control information when detection is made about a correlation between the binary data and a random access end synchronization word.

This shows that the fifth reference discloses a technique of independently receiving the random access signal from a plurality of mobile stations at every path.

In addition, Japanese Patent Publication No. 2765574 (will be called sixth reference) discloses a CDMA chip synchronization circuit that is used in a mobile communication system of a wideband CDMA type and that enables improvement of reception quality in a wideband CDMA receive and high speed transmission. Such improvement of the reception quality and the high speed transmission can be achieved by securely detecting or tracking multi-path timing within a low Eb/No environment. More specifically, the CDMA chip synchronization circuit described in the sixth reference has a search portion for detecting reception timing and a correlator for carry out correlation calculation (de-spread operation) at predetermined timing that may be shifted, for example, at one-fourth (¼) time interval with reference to the reception timing. Thereafter, selection is made of a timing signal that gives a most excellent reception quality after the de-spread operation. This structure enables reliable reception even when the reception timing is discontinuously or irregularly varied. In addition, this structure is different from DLL in the viewpoint that timing is securely captured in a peak of a reception level in a propagation environment such that a plurality of paths are not completely separated from each other and consequently are received in a superposed manner.

As mentioned before, the six reference describes about a technique of detecting reception timing by a searcher, obtaining timing shifted by a predetermined time interval shorter than a single chip period on the basis of the reception timing, simultaneously executing a correlation calculation (de-spreading), and thereafter selecting a signal that is received at timing at which reception quality is most excellent after the de-spreading. However, no teaching is directed in the sixth reference to the multi-path circuit, namely, the searcher.

SUMMARY OF THE INVENTION

It is an object of this invention to provide a multi-path detection circuit in a CDMA receiver, which can solve the above-mentioned problem and which can process multi-path detection at a high speed.

It is another object of this invention to provide a multi-path detection circuit of the type described, which can detect a plurality of path positions at a high speed.

It is still another object of this invention to provide a CDMA receiver which can quickly execute multi-path detection.

A method according to an aspect of this invention is for detecting a peak from delay profile data received through a multi-path in a CDMA receiver and comprises the steps of dividing the delay profile data into a plurality of data blocks, searching a maximum value of the delay profile data at every data block, and keeping each maximum value at every data block to detect the peak from the maximum values searched from the respective data blocks.

The method may further comprise the steps of subsequently detecting a following peak after the peak is previously detected as a previous peak. In this case, the subsequently detecting step comprises the step of masking a neighboring time region of the delay profile data adjacent to the previous peak to obtain renewed delay profile data, determining, from the renewed delay profile data, a specific one of the data blocks that includes the previous peak, and re-executing the searching step only about the specific data block to detect the following peak.

In addition, the subsequently detecting step further comprises the steps of judging, before the re-executing step, whether or not the previous peak is located on a right-hand side of a center of the specific data block to produce a result of judgment and re-executing the searching step also about either of a right-hand side data block and a left-hand side data block adjacent to the specific data block with reference to the result of judgement, along with the specific data block.

Each of the searching step and the subsequently detection step comprises the steps of comparing each of the delay profile data and the renewed delay profile data with a predetermined reference correlation level and stopping each of the searching and the subsequently detecting steps at a time instant at which a peak lower than the predetermined reference correlation level is detected.

According to another aspect of this invention, a multi-path detection circuit is for use in a CDMA receiver to measure a delay profile from a multi-path and to detect timing of the multi-path and comprises means for dividing delay profile data representative of the delay profile into a plurality of data blocks, a delay profile memory for storing the respective data blocks, searching means for searching a maximum value at every one of the data blocks in connection with the delay profile data to determine a peak at every data block as a result of the search, and generating means for generating the timing of the multi-path with reference to the peak.

The multi-path detection circuit may further comprise means for renewing the delay profile data into renewed delay profile data by masking a neighboring time region of the delay profile data adjacent to the peak detected so as to detect a next following peak in the renewed delay profile data after the peak, means for selecting a specific one of the data blocks that includes the peak previously detected, and control means for making the search means search a following maximum value again only about the specific block of the renewed delay profile data.

In this case, the control means comprises means for judging whether or not the previously detected peak is located on a right-hand side of a center of the specific data block, to produce a result of judgment and means for making the searching means re-execute the search in connection with either one of the data blocks adjacent to the specific data block on its right-hand side or left-hand side with reference to the result of judgment.

The control means may carry out a control operation such that each peak detected is compared with a predetermined reference correlation level to detect a low peak lower than the predetermined reference correlation level and the search is stopped when the low peak is detected.

According to yet another aspect of this invention, a multi-path detection circuit comprises a matched filter for measuring a delay profile data of a multi-path by calculating a correlation value between a spread code and a reception signal, a first memory selector for dividing the measured delay profile data into a plurality of data blocks, a delay profile memory which has a plurality of memory blocks for storing the respective data blocks, a second memory selector for selecting each of the data blocks stored in the delay profile memory, a first maximum value searching portion for searching a block maximum value and a block maximum position at every data block selected by the second memory selector to successively produce a first result of the search, a peak preservation portion for successively preserving the first result of the search, a second maximum value searching portion for searching a further maximum value among the first results of the search that are preserved in the peak preservation portion and that are detected from the respective data blocks, to produce a second result of the search, and a path timing generator for generating path timing with reference to the second result of the search.

According to another aspect of this invention, a CDMA receiver comprises a radio portion for frequency-converting a reception signal into a frequency converted signal, an A/D converter for carrying out analog to digital conversion of the frequency converted signal to produce a digital signal, a multi-path detection circuit for measuring a delay profile of a transmission path from the digital signal to detect timing of a multi-path as multi-path timing, a rake finger portion for receiving the digital signal at the multi-path timing to produce reception data, and a rake combiner for combining the reception data. The multi-path detection circuit comprises means for dividing delay profile data representative of the delay profile into a plurality of data blocks, a delay profile memory for storing the respective data blocks, searching means for searching a maximum value at every one of the data blocks in connection with the delay profile data to determine a peak at every data block as a result of the search, and generating means for generating the timing of the multi-path with reference to the peak.

As mentioned above, a maximum search operation is executed in this invention about all data blocks of the delay profile data only on detecting a first peak. The following peaks are detected by executing maximum search operations only about renewed data or memory blocks of the delay profile data so as to renew maximum value information. In the remaining memory blocks except the renewed memory blocks, use is made of maximum value information previously searched and, therefore, it is possible to remarkably reduce a cycle number for detecting the following peaks.

DESCRIPTION OF THE PREFERRED EMBODIMENTS

Figure 1:
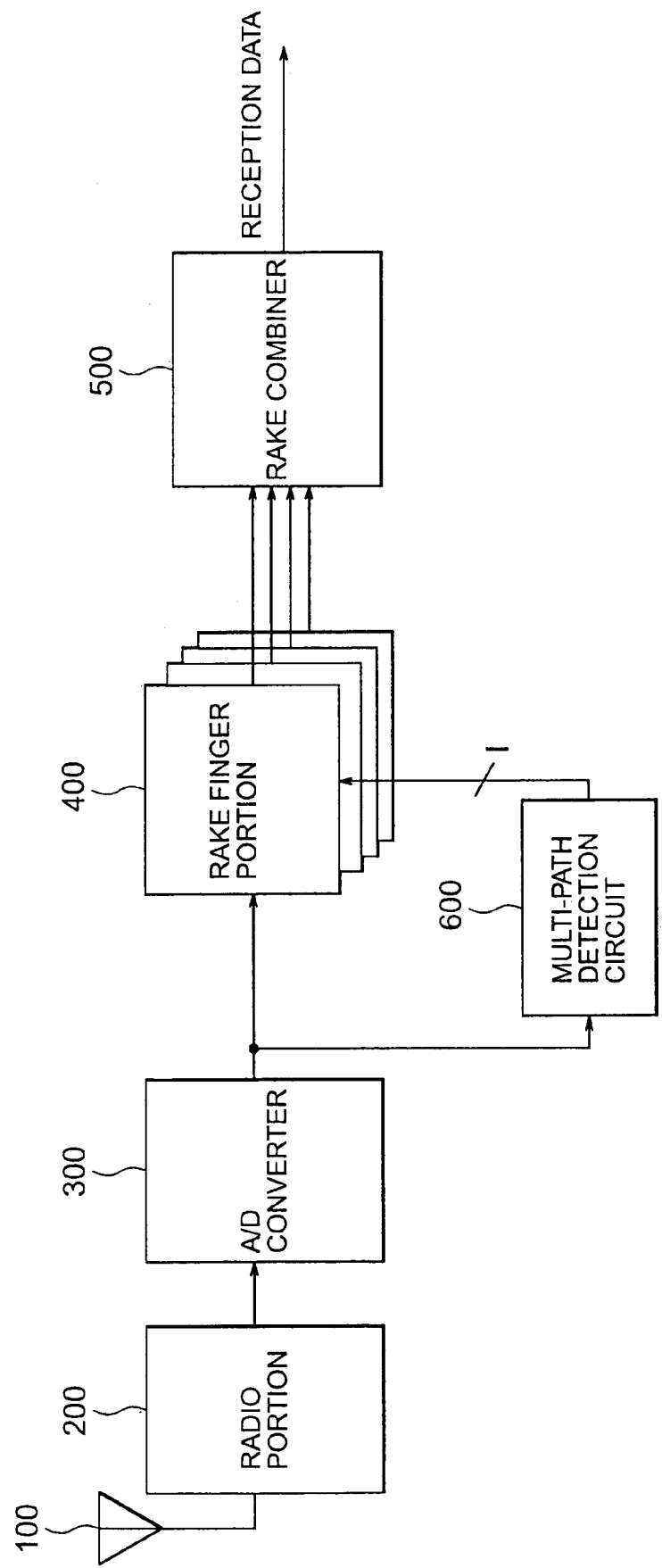
FIG. 1 shows a block diagram for use in describing a CDMA receiver which includes a multi-path detection circuit according to a first embodiment of this invention.

Referring to FIG. 1, a CDMA receiver will be described which includes a multi-path detection circuit 600 according to a first embodiment of this invention. In addition to the multi-path detection circuit 600, the illustrated CDMA receiver has an antenna portion 100, a radio portion (high frequency reception section) 200, an A/D converter 300, a rake finger portion 400, and a rake combiner or synthesizer 500.

A sequence of data is transmitted as a radio signal and is received as a reception signal through the antenna portion 100 by the CDMA receiver. The reception signal is subjected by the radio portion 200 to frequency conversion (down conversion) and is converted by the A/D converter 300 into a digital signal from an analog signal. The digital signal output from the A/D converter 300 is supplied to the multi-path detection circuit 600.

As will be mentioned later, the multi-path detection circuit 600 measures a delay profile of a propagation path from the digital signal and detects each timing of multi-paths to produce a reception timing signal. The reception timing signal supplied from the multi-path detection circuit 600 is given to the rake finger portion 400 to be used as reception timing. The rake finger portion 400 carries out reception operation of the digital signal with reference to the reception timing signal. The illustrated rake finger portion 400 is composed of first through N-th rake fingers 400-1 to 400-N which produce reception data signals with reference to the reception timing. The reception data signals are combined by the rake combiner 500 into an output signal or a reception data signal.

Figure 2:
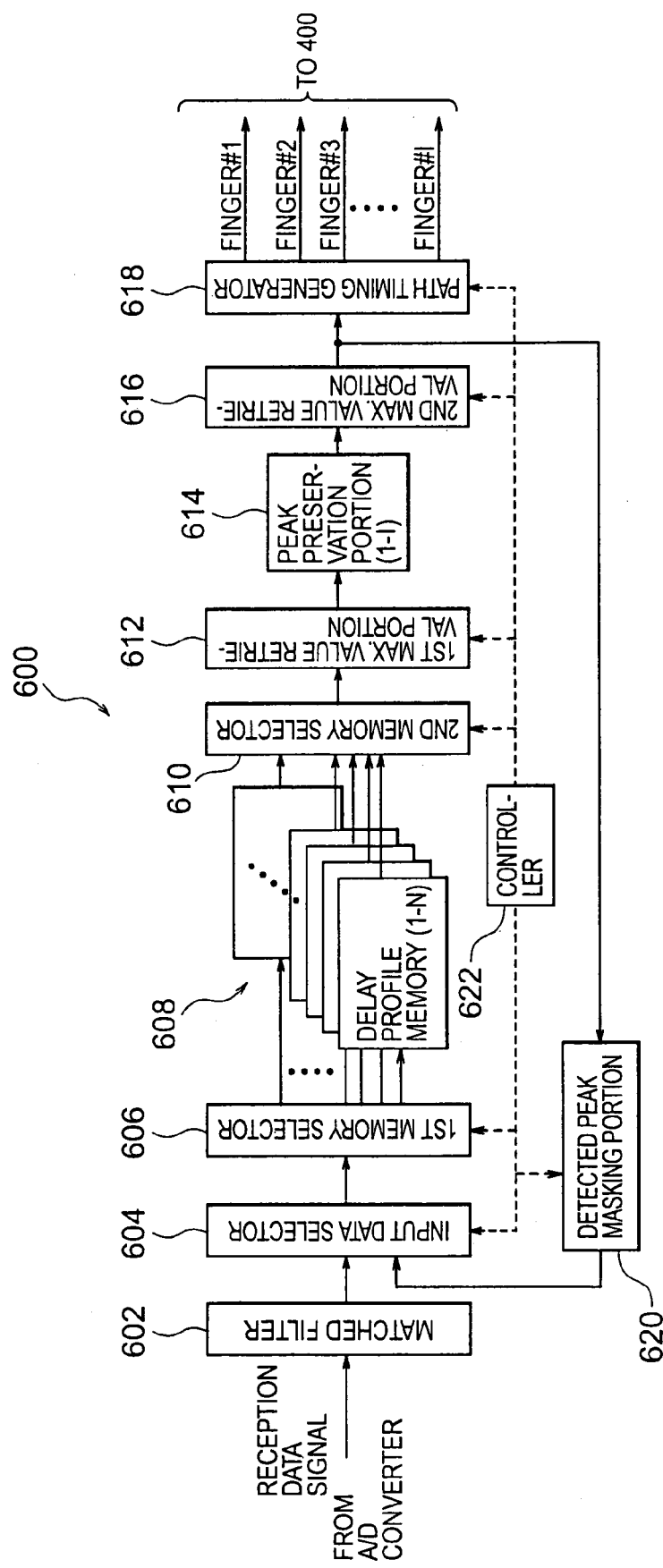
FIG. 2 shows a block diagram for use in describing the multi-path detection circuit illustrated in FIG. 1 in detail.

Referring to FIG. 2 together with FIG. 1, description will be directed to the multi-path detection circuit 600 according to the first embodiment of this invention. The illustrated multi-path detection circuit 600 has a matched filter 602, an input data selector 604, a first memory selector 606, a delay profile memory 608, a second memory selector 610, a first maximum value retrieval portion (search portion) 612, a peak preservation portion 614, a second maximum value retrieval portion 616, a path timing generator 618, a detected peak masking portion 620, and a controller 622. In the illustrated example, it is to be noted that the delay profile memory 608 is structured by first through N-th memory blocks, where N is an integer greater than unity.

The controller 622 serves to control the input data selector 604, the first and the second memory selectors 606 and 610, the first and the second maximum value retrieval portions 612 and 616, the path timing generator 618, and the detected peak masking portion 620 in a manner to be described later in detail. To this end, an input data selection control signal, a first memory selection control signal, a second memory selection control signal, a first maximum retrieval control signal, a second maximum retrieval control signal, a path timing control signal, and a peak mask control signal are supplied from the controller 622 to the input data selector 604, the first and the second memory selectors 606 and 610, the first and the second maximum value retrieval portions 612 and 616, the path timing generator 618, and the detected peak masking portion 620, respectively.

The matched filter 602 is operable to receive the reception data signal from the A/D converter 300, to calculate a correlation value between a spread code and the reception data signal, and to produce a correlation signal representative of the correlation value. In other words, the matched filter 602 serves to measure each delay profile of the propagation paths and to produce delay profile data signals. The delay profile data signals measured by the matched filter 602 are given to the first memory selector 606 through the input data selector 604 and are divided by the first memory selector 606 into first through N-th data blocks.

The first through the N-th data blocks are stored in the delay profile memory 608 at every data block. In other words, the first through the N-th data blocks are memorized into the first through the N-th memory blocks of the delay profile memory 608, respectively.

The second memory selector 610 is operable in response to the second memory selection control signal sent from the controller 622 to supply the delay profile data signal stored in the delay profile memory 608 to the first maximum value retrieval portion 612 at every data block. The first maximum value retrieval portion 612 searches or retrieves a block maximum or peak value and its maximum (peak) position of the selected data block to supply the peak preservation portion 614 with a search result. The second maximum value retrieval portion 616 detects a maximum value from the block peaks or the block maximum values preserved in the peak preservation portion 614 and supplies a detected result to the path timing generator 618.

When the maximum value is detected by the second maximum value retrieval portion 616, the detected peak masking portion 620 is operated to clear data elements to be masked in the delay profile memory 608 and to thereby remove peak positions and their neighboring data from the delay profile memory 608. The input data selector 604 is operable in response to the input data selection control signal to select the data elements to be masked and, as a result, the reception data and the detected peaks are removed.

On detecting an initial or the first peak (may be called as a previous peak also), the controller 622 controls the first maximum value retrieval portion 612 so that a maximum value is retrieved or searched from a whole of the data blocks stored in the delay profile memory 608 as the delay profile data.

On detecting a second peak or the other following peaks, the controller 622 controls the detected peak masking portion 620 so that retrieving a maximum or peak value is carried out only about the data blocks updated in the delay profile data. Thus, a maximum value in each memory block can be individually updated or renewed. Since the maximum value that is retrieved once or the first time is used in connection with the remaining memory blocks except the updated memory block, it is possible to largely reduce the number of cycles for detecting the second and the other following peaks.

In addition, the matched filter 602 illustrated in FIG. 2 will not be described in detail because it is well known in the art so as to measure the delay profile. Instead of the matched filter 602, a sliding correlator may be used. In addition, the rake finger portion 400 and the rake combiner 500 illustrated in FIG. 1 are also known in the art and are directly not related to this invention. Therefore, description will not be omitted about the rake finger portion 400 and the rake combiner 500 also.

Figure 3:
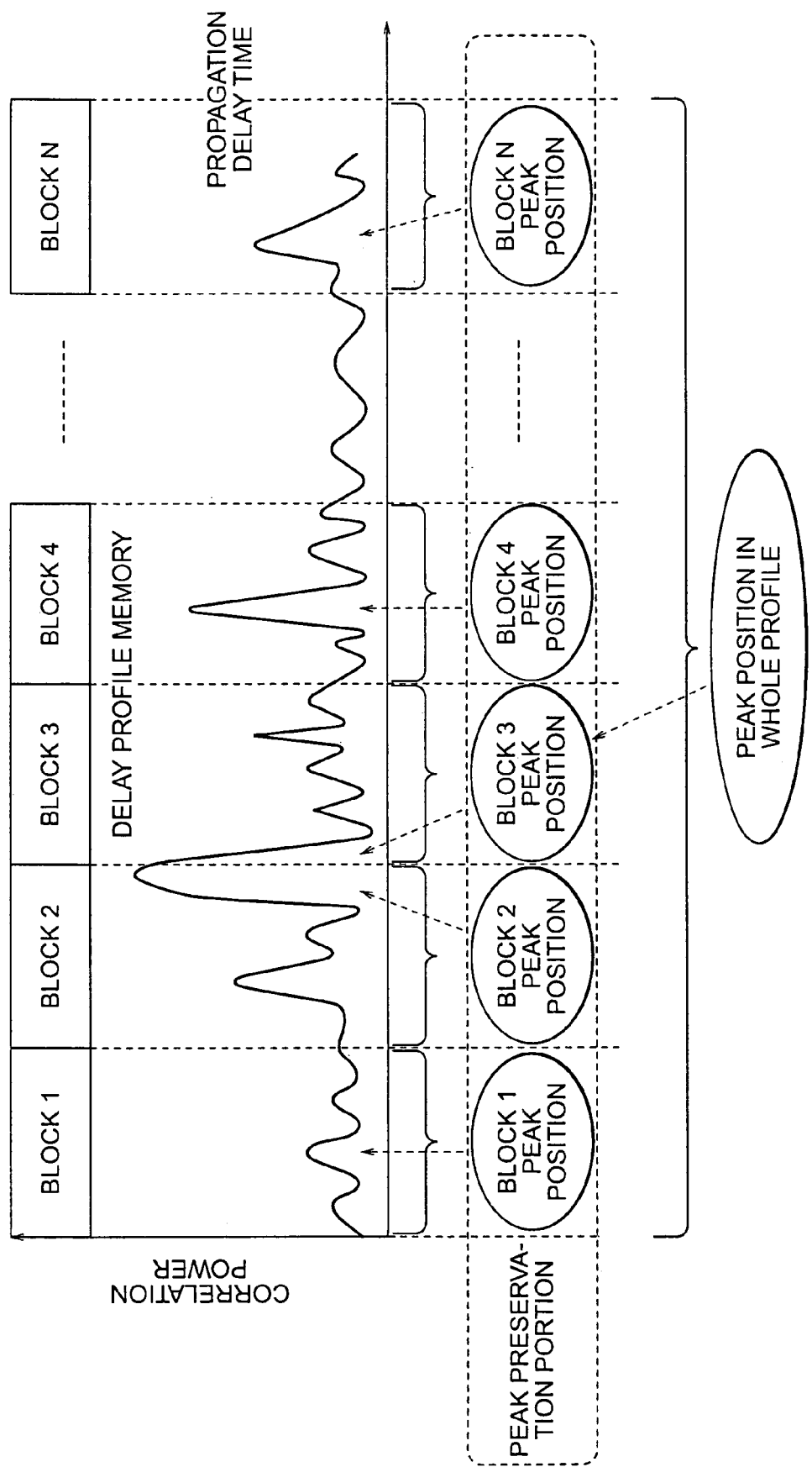
FIG. 3 shows a time chart for use in describing operation of searching a first peak from delay profile data preserved in a delay profile memory illustrated in FIG. 2.
Figure 4:
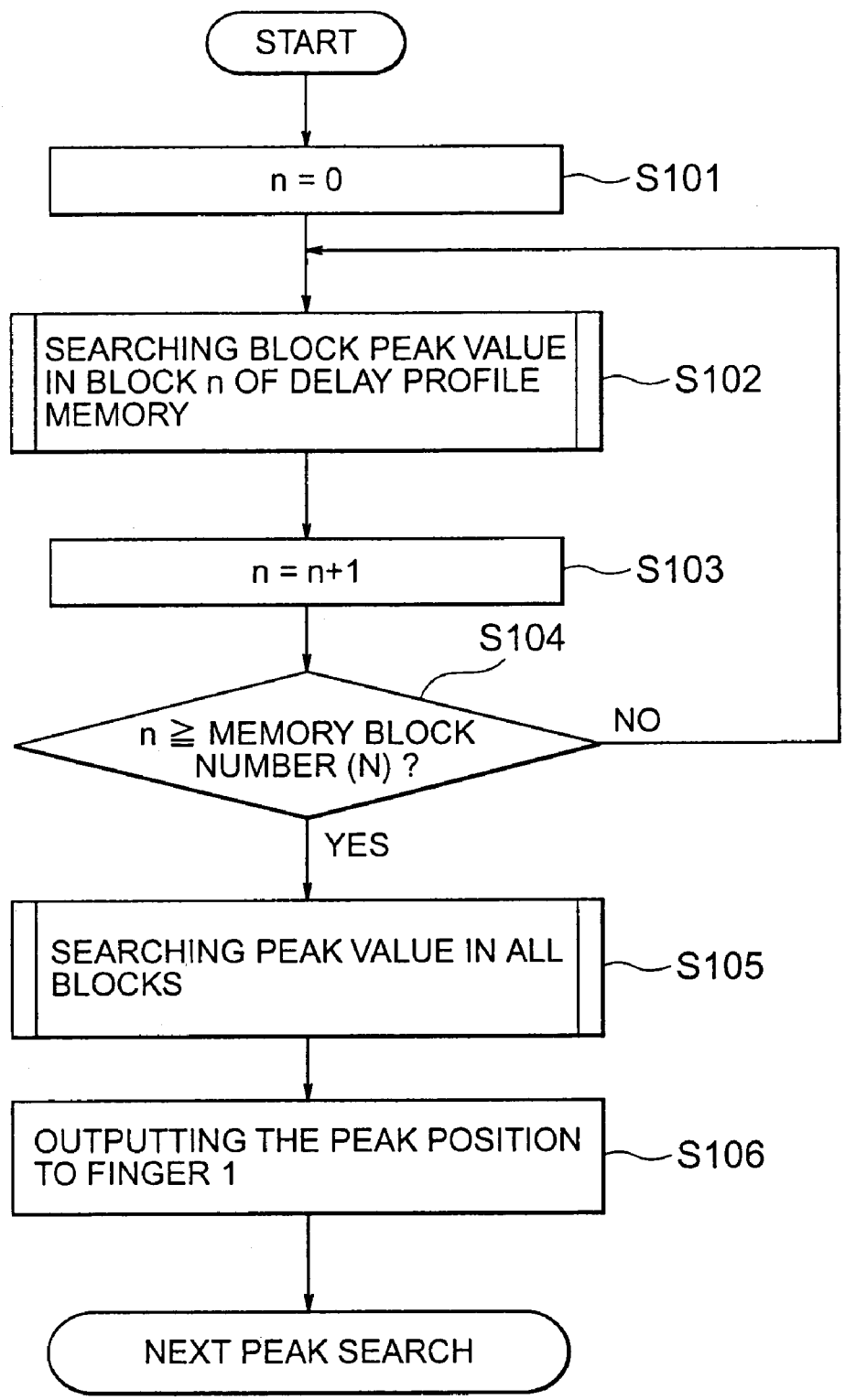
FIG. 4 shows a flow chart for use in describing a processing procedure for detecting the first peak in the multi-path detection circuit illustrated in FIG. 2.

Referring to FIGS. 3 and 4, description will be made about operation that is executed when the multi-path detection circuit 600 detects the first one of the peaks. In FIG. 3, illustration is made about retrieving or searching a maximum or peak value from the delay profile data preserved in the delay profile memory 608 shown in FIG. 2. In this case, it is assumed that the whole delay profile data are divided into first through N-th data blocks and preserved or stored in the first through the N-th memory blocks of the delay profile memory 608, respectively. In addition, the first through the N-th memory blocks are assumed to be indicated by the block numbers from 0 to (N−1), respectively. On the other hand, FIG. 4 shows a flow chart for describing operation of detecting the first peak in the multi-path detection circuit 600.

In FIGS. 2, 3, and 4, the above-mentioned block number is successively counted by a block number counter (not shown). At first, a count (n) of the block number counter is reset into 0 under control of the controller 622 at a step S101 in FIG. 4. Next, the controller 622 controls the first maximum value retrieval portion 612 so that retrieving a block maximum value is executed in the data block stored in the (n+1)-th one of the memory blocks designated by the block number n. As a result, the block maximum value retrieved is preserved as a block peak value in the peak preservation portion 614 together with its peak position (step S102). Subsequently the controller 622 makes the block number counter count up by one into (n+1) (step S103). The controller 622 makes the first maximum value retrieval portion 612 repeatedly count each data block until the count (n) of the block number counter becomes equal to or exceeds the total block number (N) (step S104). When the count (n) is not smaller that N, the peak preservation portion 614 is loaded with a whole of maximum values related to all of the data blocks. In this case, the controller 622 controls the second maximum value retrieval portion 616 so as to retrieve or search a peak or maximum value from the block maximum values stored in the peak preservation portion 614 (S105). Furthermore, the path timing generator 618 supplies a detected maximum position of the peak value to a finger #1 of the rake finger portion 400 (step S106).

Figure 5:
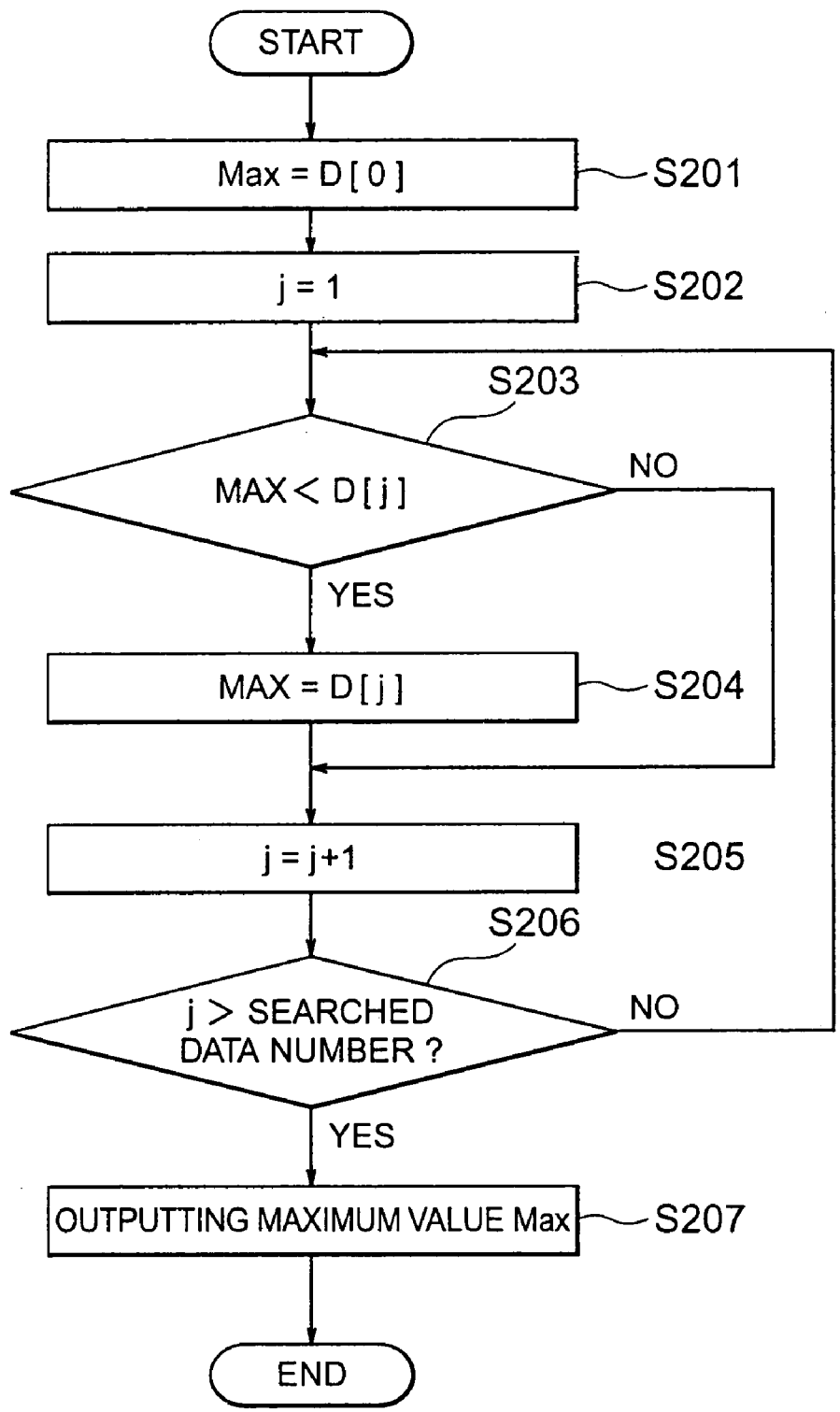
FIG. 5 shows a flow chart for use in describing a maximum value searching operation carried out in a part of the processing procedure illustrated in FIG. 4.

Referring to FIG. 5, description will be made in detail about operation of retrieving or searching a maximum value that is mentioned in FIG. 4. In this event, the first maximum value retrieval portion 612 substitutes a value D(0) stored in the block address number 0 of the memory block for a variable Max (step S201). The first maximum value retrieval portion 612 sets a count (j) of a counter (not shown) into 1 (step S202) to detect a value D(1) of the first memory block. At a step S203, comparison is made between the value D(1) of the first memory block and the variable Max. Generally, D(j) of the j-th memory block is compared with the variable Max at the step S203. When the value D(j) exceeds the variable Max(step S203:Yes), the first maximum value retrieval portion 612 substitutes D(j) for the variable Max (step S204). Next, the first maximum value retrieval portion 612 controls the counter so as to count up by one and to render the count (j) into (j+1) (step S205). The first maximum value retrieval portion 612 repeats the above-mentioned operation until the count (j) of the counter exceeds a searched data number (step S206). Finally, a maximum value is thus obtained as the variable Max (step S207). In order to attain an address number (j) of the maximum value, the address number (j) is kept as a maximum position at the step S204 and is substituted into the variable.

When the operation is executed in the above-mentioned manner, a processing time of detecting a peak or a maximum value is mainly determined in dependency upon processing from the step S203 to the step S205. This means that the processing time is determined by repetition times of processing that is started from comparing data read out of the memory with a held value and completed by updating a maximum value.

The repetition times for retrieving the first peak or maximum value are given by:

$$(K/N)N+N,$$

where K is representative of a sample number of the total delay profile data; N, the block number to be divided. In the above-formula, (K/N) in the first term represents repetition times needed for retrieving the maximum value from a single block while the second term, N, represents repetition times needed for retrieving whole peaks form each peak of the individual blocks.

Figure 6A:
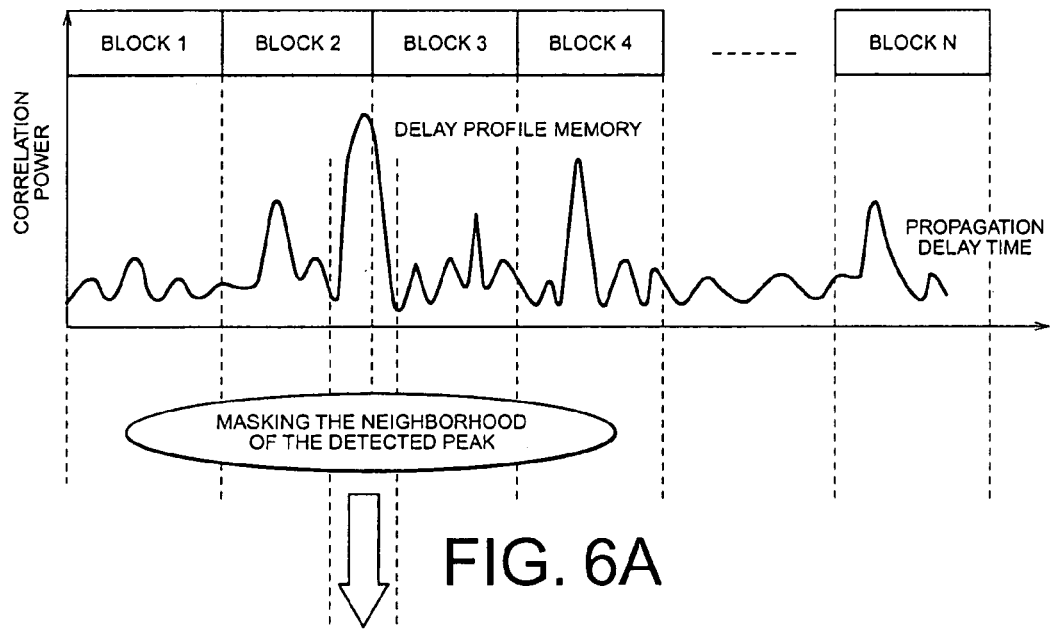
FIGS. 6A and 6B show time charts for use in describing operation of searching a second and the following peaks from the delay profile data.
Figure 6B:
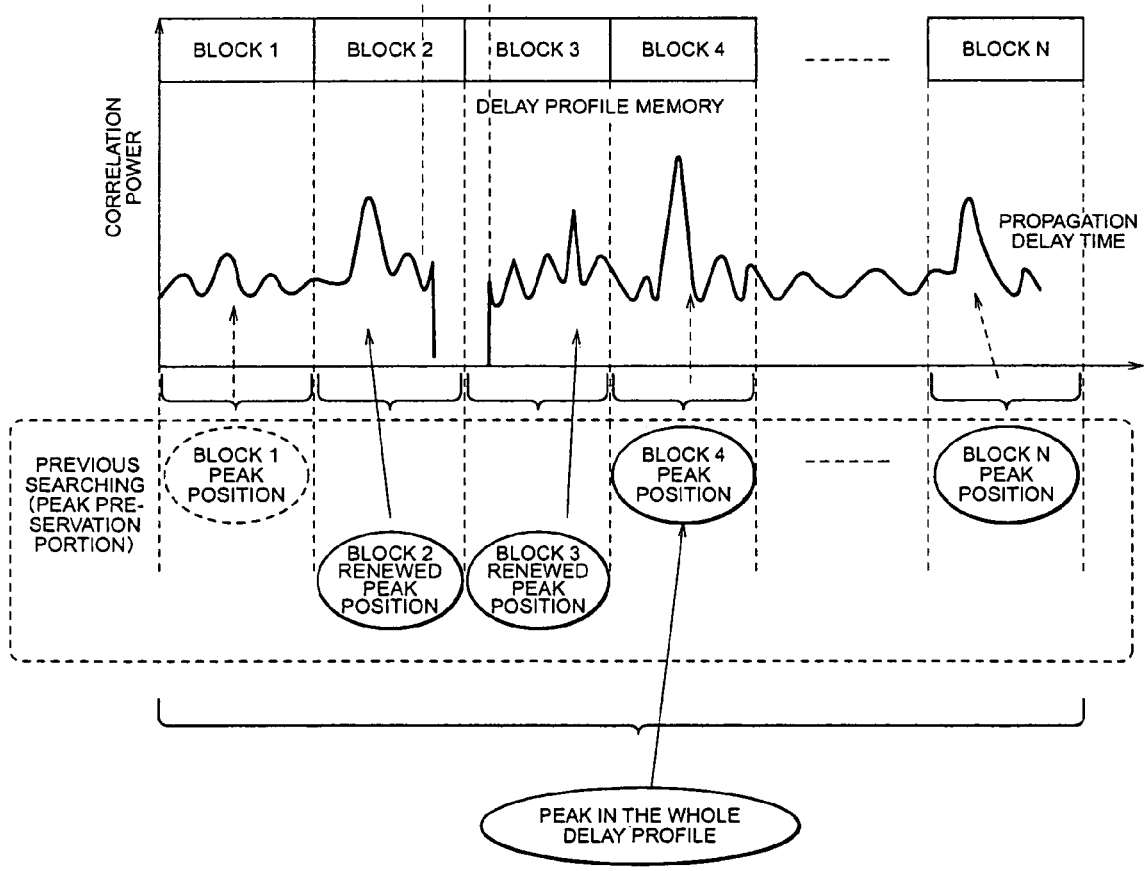
Figure 7:
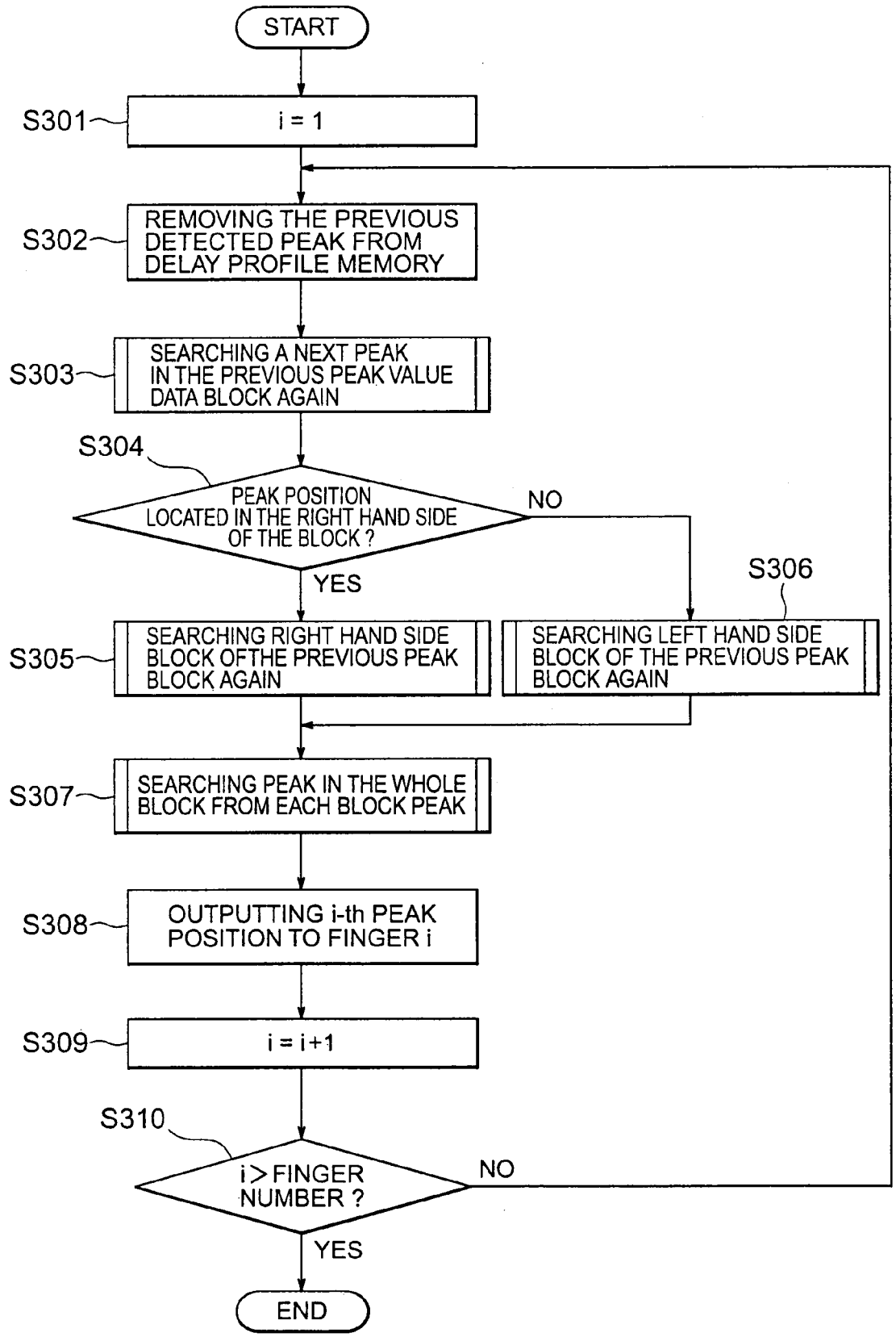
FIG. 7 shows a flow chart for use in describing a processing procedure for detecting the second and the following peaks in the multi-path detection circuit illustrated in FIG. 2.

Referring to FIGS. 6 and 7, description will be made about procedure of detecting a second or next peak and the following peaks, which may be collectively called subsequent peak or peaks. FIGS. 6(A) and (B) are illustrative of processing the delay profile data while FIG. 7 shows a flow chart for describing a processing procedure of detecting each subsequent peak.

As shown in FIG. 7, the controller (FIG. 2) controls a peak detection counter (not shown) for counting the number of peaks so as to set a count (i) of the counter into 1 (step S301). The controller 622 controls the detected peak masking portion 620 so that correlation peak data previously detected by prior processing are removed from the delay profile memory 608 (step S302). In this event, it is noted that the correlation peak is expanded along a time axis, as shown in FIG. 6(A). Taking this into consideration, not only data at a peak point but also neighborhood data of t-samples before and after the peak point are cleared into 0 with reference to a sampling period of the reception data. As a result, a memory block from which peak data are removed is caused to occur in the memory blocks of the delay profile memory 608 and may be referred to as a peak removed memory block.

As regards the peak removed memory block, retrieving a maximum value is re-executed in accordance with a flow chart as shown in FIG. 5 by the first maximum value retrieval portion 612 under control of the controller 622. This shows that a subsequent peak is searched in the previous peak value data block. Consequently, the previous maximum or peak value of the data block in the peak removed memory block is renewed in the peak preservation portion 614 (step S303).

As mentioned before, the correlation peak value is expanded before and after the peak point over the t-samples. This means that data of the memory block or blocks adjacent or next to the re-executed memory block may be undesirably cleared into 0. Taking this into consideration, judgment is made about whether or not the peak position previously detected is located on a right-hand side relative to a center position of the memory block (step S304). When the peak position previously detected is located on the right-hand side of the center position (step S304: Yes), the controller 622 makes the first maximum value retrieval portion 612 re-execute a retrieval operation of a maximum value also in connection with a right-hand side memory block next to the memory block renewed at the step S303 (step S305). At the step S305, the maximum or peak value of the right-hand side memory block is also renewed in the peak preservation portion 614.

On the other hand, when the previously detected peak position is not located on the right-hand side of the center position, namely, is located on the left-hand side of the center position (step S304: No), the controller 622 makes the first maximum value retrieval portion 612 process a step S306. At the step S306, the first maximum value retrieval portion 612 re-executes a retrieval operation of a maximum value in connection with a left-hand side memory block located on the left-hand side of the memory block renewed at the step S303. Like the right-hand side memory block, a maximum value of the left-hand side memory block is renewed in the peak preservation portion 614 at the step S306. The above-mentioned processing may not be executed when no memory block is present on the right-hand side and the left-hand side of the memory block previously renewed.

In the above-mentioned manner, each maximum value preserved in the peak preservation portion 614 is renewed at every one of the memory blocks. Under the circumstances, the second maximum retrieval portion 616 retrieves a maximum value from the peak values preserved over the block number of the memory blocks in the peak preservation portion 614 (step S307). The path timing generator 618 supplies an i-th one of the fingers with an i-th one of the peak positions as reception timing (step S309). Next, the controller 622 controls the above-mentioned peak detection counter so that the count i is counted up into (i+1) (step S309). Similar operation is repeated over the number of necessary peak values (for example, the number of the fingers) (step S310). Thus, the multi-path detection circuit 600 can supply reception timing to all of the fingers.

In the example shown in FIG. 6(A), the peak is located on the right-hand side of the block 2 and is expanded over both the blocks 2 and 3. When the illustrated peak is detected, the peak is removed from the blocks 2 and 3, as shown in FIG. 6(B). Next, search or retrieval operation is re-executed in connection with the blocks 2 and 3 to renew peak positions.

In the above-mentioned operation, the repetition times of retrieving or searching the subsequent peaks are given by:

$$[(K/N)2+N] \times [I-1],$$

where I represents the peak number; (K/N) in the first term, repetition times for retrieving a maximum value in a single memory block; and N, repetition times for retrieving all peaks from each peak of the memory blocks.

In the multi-path detection circuit 600 according to the first embodiment of this invention, each peak value is stored or preserved at every one of the memory block. With this structure, it is possible to reduce the processing steps (the above repetition times) of retrieving the second and the following peaks and to decrease current consumption.

Figure 8:
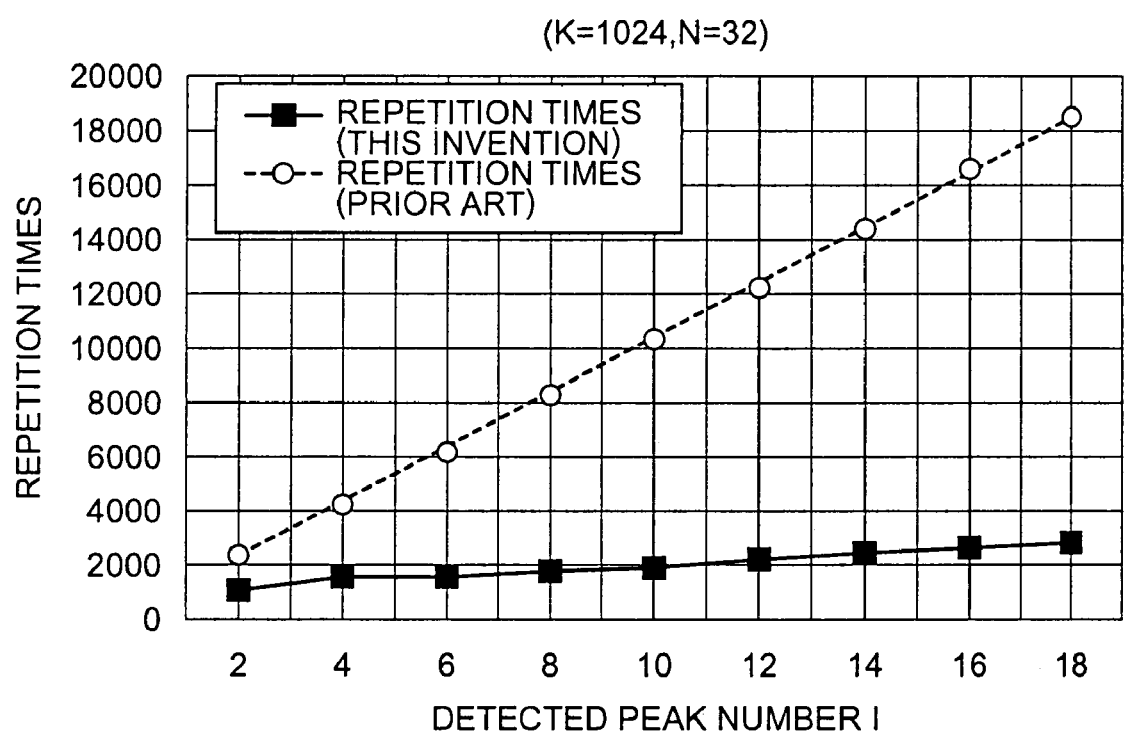
FIG. 8 shows a graph for use in describing improvement of a detection time by using the multi-path detection circuit illustrated in FIG. 2 and by comparing a conventional method.

Referring to FIG. 8, illustration is made about improvement of specific processing times. In FIG. 8, it is assumed that a conventional method repeats a maximum value retrieval as shown in FIG. 5 I-times. In this case, repetition times are represented by:

$$K \times I,$$

where K represents a total sample number of delay profile data and I represents the detected peak number.

On the other hand, when the flow according to this invention is used, the repetition times are given by:

$$[(K/N)N+N]+[(K/N)2+N](I-1),$$

where N represents the number of the memory blocks.

In the example illustrated in FIG. 8, the data sample number K of the delay profile and the number N of the memory blocks are assumed to be equal to 1024 samples and 32, respectively. In both the conventional method and the embodiment according to this invention, the repetition times tend to increase with an increase of the detected peak number I, as readily understood from FIG. 8. However, an increment according to this invention is considerably small in comparison with an increment of the conventional method.

In fact, about six fingers are generally used in wide band CDMA and more than six peaks should be detected. When the detected peak number I is equal to 6, the repetition times of this invention are about one-fourth of those of the conventional method and the processing time of this invention can be reduced to one-fourth of the conventional method.

Figure 9:
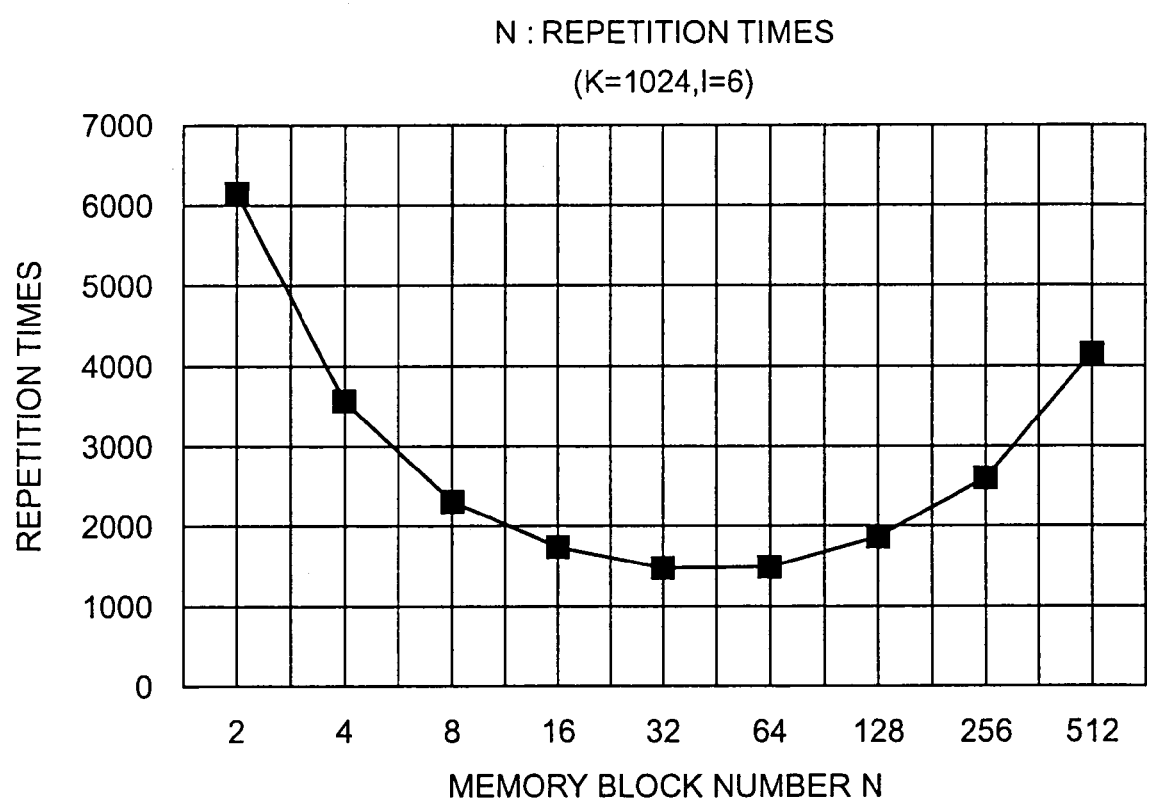
FIG. 9 shows a graph for describing a relationship between the number of memory blocks and repetition times on the condition that the sample number K of the delay profile data and the searching number I are equal to 1024 and 6, respectively.

In order to maximize the effect of the first embodiment according to this invention, it is necessary to set the sample value K of the delay profile data and the memory block number N into appropriate values, respectively. As shown in FIG. 9, a most improved effect is attained when the memory block number N becomes equal to 32 on the condition that K=1024.

Figure 10:
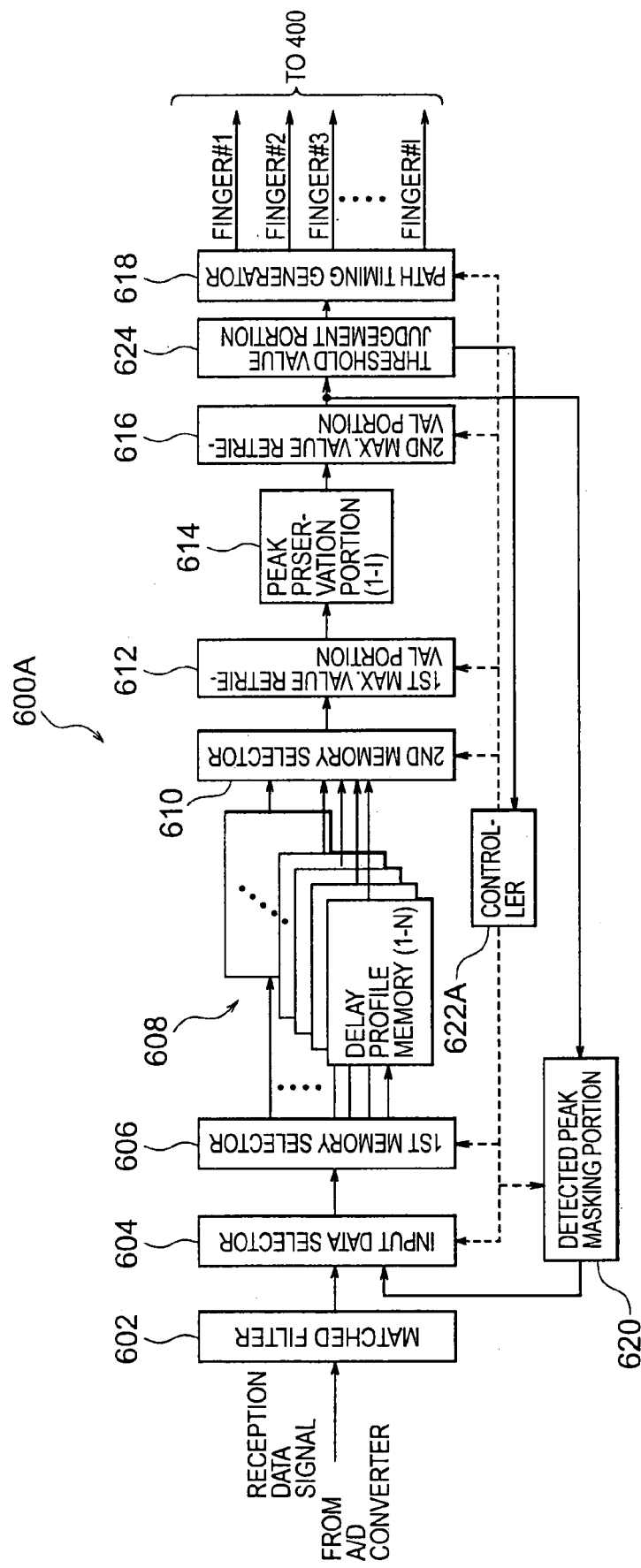
FIG. 10 shows a block diagram for use in describing a multi-path detection circuit according to a second embodiment of this invention.

Referring to FIG. 10, a multi-path detection circuit 600A according to a second embodiment of this invention is similar in structure to that illustrated in FIG. 1 except that a threshold detection portion 624 is added between the second maximum value retrieval portion 616 and the path timing generator 618 and that a control operation of a controller 622A is somewhat different from that of the controller 622 illustrated in FIG. 2.

As shown in FIG. 10, inclusion of the threshold detection portion 624 is effective to shorten a detection time. Specifically, the threshold detection portion 624 has a predetermined threshold level defined by a reference correlation level and compares a peak value with the predetermined threshold level. When the threshold detection portion 624 detects a peak value that is lower than the predetermined threshold level, a stop signal is sent from the threshold detection portion 624 to the controller 622A so as to stop peak detection processing at a time instant of detecting the peak value lower than the predetermined threshold value.

With this structure, when only a single peak is present, processing can be stopped which detects a second peak and the following peaks at a time instant at which the single peak is detected. Thus, waste operation and consumed current can be saved by the multi-path detection circuit 600A.

While this invention has thus far been described in conjunction with a few embodiments thereof, it will readily be possible for those skilled in the art to put this invention into practice in various other manners. For example, this invention can be also used to detect a correlation peak on searching a base station. As mentioned before, this invention can reduce a detection time necessary for detecting a plurality of correlation peaks by dividing the delay profile data into a plurality of data blocks to store the respective data blocks into a plurality of memory blocks and by keeping a peak value at every one of the data blocks. In addition, a path detection time can be shortened in this invention by re-executing a maximum value retrieval operation only about the memory block which includes a detected peak on searching the second and the following peaks.

What is claimed is:

1. A method of detecting a peak from delay profile data received through a multi-path in a CDMA receiver, comprising the steps of:
   dividing the delay profile data into a plurality of data blocks;
   searching a maximum value of the delay profile data at every data block; and
   storing each maximum value at every data block to detect the peak from the maximum values searched from the respective data blocks
   subsequently detecting a following peak after the peak is previously detected as a previous peak using said stored maximum values;
   wherein the subsequently detecting step further comprises the steps of:
   masking a neighboring time region of the delay profile data adjacent to the previous peak to obtain renewed delay profile data;
   determining, from the renewed delay profile data, a specific one of the data blocks that includes the previous peak; and
   judging whether or not the previous peak is located on a right-hand side of a center of the specific data block to produce a result of judgement; and
   re-executing the searching step also about either of a right-hand side data block and a left-hand side data block adjacent to the specific data block with reference to the result of judgement along with the specific data block.

2. A method as claimed in claim 1, wherein each of the searching step and the subsequently detection step comprises the steps of:
   comparing each of the delay profile data and the renewed delay profile data with a predetermined reference correlation level; and
   stopping each of the searching and the subsequently detecting steps at a time instant at which a peak lower than the predetermined reference correlation level is detected.

3. A multi-path detection circuit for use in a CDMA receiver to measure a delay profile from multi-path and to detect timing of the multi-path, comprising:
   means for diving delay profile data representative of the delay profile into a plurality of data blocks;
   a delay profile memory for storing the respective data blocks;
   searching means for searching a maximum value at every one of the data blocks in connection with delay profile data determine a peak as a result of the search; and
   generating means for generating the time of the multi-path with reference to the peak
   means for renewing the delay profile data into renewed delay profile data by masking a neighboring time region of the delay profile data adjacent to the peak detected so as to detect a next following peak in the renewed delay profile data after the peak is determined by the searching means;
   means for selecting a specific one of the data blocks that includes the peak previously detected; and
   control means for making the search means search a following maximum value again only about the specific block of the renewed delay profile data
   wherein the control means comprises:
   means for judging whether or not the previously detected peak is located on a right-hand side of a center of the specific data block, to produce a result of judgment; and
   means for making the searching means re-execute the search in connection with either one of the data blocks adjacent to the specific data block on its right-hand side or left-hand side with reference to the result of judgement.

4. A multi-path detection circuit as claimed in claim 3, wherein the control means carries out a control operation such that each peak detected is compared with a predetermined reference correlation level to detect a low peak lower than the predetermined reference correlation level and the search is stopped when the low peak is detected.

5. A multi-path detection circuit comprising:
   a matched filter for measuring a delay profile data of a multi-path by calculating a correlation value between a spread code and a reception signal;
   a first memory selector for dividing the measured delay profile data into a plurality of data blocks;
   a delay profile memory which has a plurality of memory blocks for storing the respective data blocks;
   a second memory selector for selecting each of the data blocks stored in the delay profile memory;
   a first maximum value searching portion for searching a block maximum value and a block maximum position at every data block selected by the second memory selector to successively produce a first result of the search;
   a peak preservation portion for successivley preserving the first result of the search;
   a second maximum value searching portion for searching a further maximum value among the first results of the search that are preserved in the peak preservation portion and that are detected from the repsective data blocks, to produce a second result of the search; and
   a path timing generator for generating path timing with reference to the second result of the search
   a detected peak masking portion for masking data at a peak position and its adjacent region of the delay profile data in the delay profile memory by clearing the data at the peak position and its adjacent region of the delay profile from the delay profile memory; and
   a controller for controlling the first maximum value searching portion so that the first maximum value searching portion executes, on detecting a first peak as a previous peak, a maximum value searching operation in connection with a whole of the data blocks stored in the delay profile memory while the first maximum value searching portion re-executes, on detecting a next peak following the previous peak, the maximum value searching operation only in connection with a renewed data block of the delay profile data by the detected peak masking portion.

6. A CDMA receiver comprising a radio portion for frequency-converting a reception signal into a frequency converted signal, an A/D converter for carrying out analog to digital conversion of the frequency converted signal to produce a digital signal, a multi-path detection circuit for measuring a delay profile of a transmission path from the digital signal to detect timing of a multi-path as multi-path timing, a rake finger portion for receiving the digital signal at the multi-path timing to produce reception data, and a rake combiner for combining the reception data wherein;

the multi-path detection circuit comprises;

means for dividing delay profile data representative of the delay profile into a plurality of data blocks;

a delay profile memory for storing the respective data blocks;

searching means for searching a maximum value at every one of the data blocks in connection with delay profile data determine a peak as a result of the search; and generating means for generating the timing of the multi-path with reference to the peak;

means for renewing the delay profile data into renewed delay profile by masking a neighboring time region of the delay profile data adjacent to the peak detected so as to detect a next following peak in the renewed delay profile data;

means for selecting a specific one of the data blocks that includes the peak previously detected; and control means for making the search means search a following maximum value again only about the specific block of the renewed delay profile data;

wherein the control means comprises:

means for judging whether or not the previously detected peak is located on a right-hand side of a center of the specific data block, to produce a result of judgement; and means for making the searching means re-execute the search in connection with either one of the data blocks to the specific data block on its right-hand side or left-hand side with reference to the result of judgement.

7. A multi-path detection circuit as claimed in claim 6, wherein the control means comprises:

means for comparing each peak detected with a predetermined reference correlation level to detect a low peak lower than the predetermined reference correlation level; and means for stopping the search when the low peak is detected.

* * * * *